US009122469B2

(12) United States Patent
Wu

(10) Patent No.: US 9,122,469 B2
(45) Date of Patent: Sep. 1, 2015

(54) EXPANSION CARD AND MOTHERBOARD FOR SUPPORTING THE EXPANSION CARD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Kang Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 428 days.

(21) Appl. No.: 13/726,622

(22) Filed: Dec. 26, 2012

(65) Prior Publication Data
US 2014/0168925 A1 Jun. 19, 2014

(30) Foreign Application Priority Data
Dec. 18, 2012 (CN) .......................... 2012 1 0549245

(51) Int. Cl.
*G06F 1/26* (2006.01)
*G06F 1/18* (2006.01)
*G06F 1/16* (2006.01)

(52) U.S. Cl.
CPC .............. *G06F 1/263* (2013.01); *G06F 1/1632* (2013.01); *G06F 1/189* (2013.01); *G06F 1/26* (2013.01); *G06F 1/266* (2013.01)

(58) Field of Classification Search
None
See application file for complete search history.

(56) References Cited

U.S. PATENT DOCUMENTS

| 5,329,491 | A | * | 7/1994 | Brown et al. | 365/185.33 |
| 5,490,117 | A | * | 2/1996 | Oda et al. | 365/226 |
| 5,534,801 | A | * | 7/1996 | Wu et al. | 327/72 |
| 5,689,202 | A | * | 11/1997 | Ranson | 327/142 |
| 5,818,781 | A | * | 10/1998 | Estakhri et al. | 365/226 |
| 5,828,892 | A | * | 10/1998 | Mizuta | 713/300 |
| 6,035,357 | A | * | 3/2000 | Sakaki | 710/301 |
| 6,327,635 | B1 | * | 12/2001 | Alston et al. | 710/301 |
| 6,982,919 | B2 | * | 1/2006 | Kumahara et al. | 365/226 |
| 7,256,517 | B2 | * | 8/2007 | Jablonski et al. | 307/75 |
| 7,675,802 | B2 | * | 3/2010 | Kagan et al. | 365/226 |
| 2005/0132236 | A1 | * | 6/2005 | Srinivasan et al. | 713/300 |

* cited by examiner

*Primary Examiner* — Tanh Nguyen
(74) *Attorney, Agent, or Firm* — Novak Druce Connolly Bove + Quigg LLP

(57) ABSTRACT

A motherboard assembly includes a motherboard and an expansion card. The motherboard includes an expansion slot with a first idle pin connected to a standby power through a resistor. The expansion card includes an edge connector having a second idle pin and first to fifth electronic switches. When the first electronic switch receives a high level signal through the first and second idle pins, the first and fourth electronic switches are turned on. The second, third, and fifth electronic switches are turned off. The second system power outputs a standby voltage through the standby voltage output terminal. When the first electronic switch receives a low level signal, the first and fourth electronic switches are turned off. The second, third, and fifth electronic switches are turned on. The standby power outputs a standby voltage through the standby voltage output terminal.

5 Claims, 2 Drawing Sheets

EXPANSION CARD AND MOTHERBOARD FOR SUPPORTING THE EXPANSION CARD

BACKGROUND

1. Technical Field

The present disclosure relates to expansion cards and motherboards for supporting the expansion cards, and particularly to a peripheral component interconnection express (PCIe) card and a motherboard for supporting the PCIe card.

2. Description of Related Art

Power distribution must be considered when designing computers. In the computer, many devices, such as integrated baseboard management controllers, platform controller hubs, and all kinds of internet cards require standby power for operation. However, standby voltages provided by a power supply unit of the computer are limited. When the standby voltages provided by the power supply unit cannot satisfy a standby voltage requirement of the computer, these elements of the computer will not operate properly. Therefore, there is room for improvement in the art.

BRIEF DESCRIPTION OF THE DRAWINGS

Many aspects of the embodiments can be better understood with reference to the following drawing. The components in the drawing are not necessarily drawn to scale, the emphasis instead being placed upon clearly illustrating the principles of the present embodiments.

DETAILED DESCRIPTION

Figure 1:
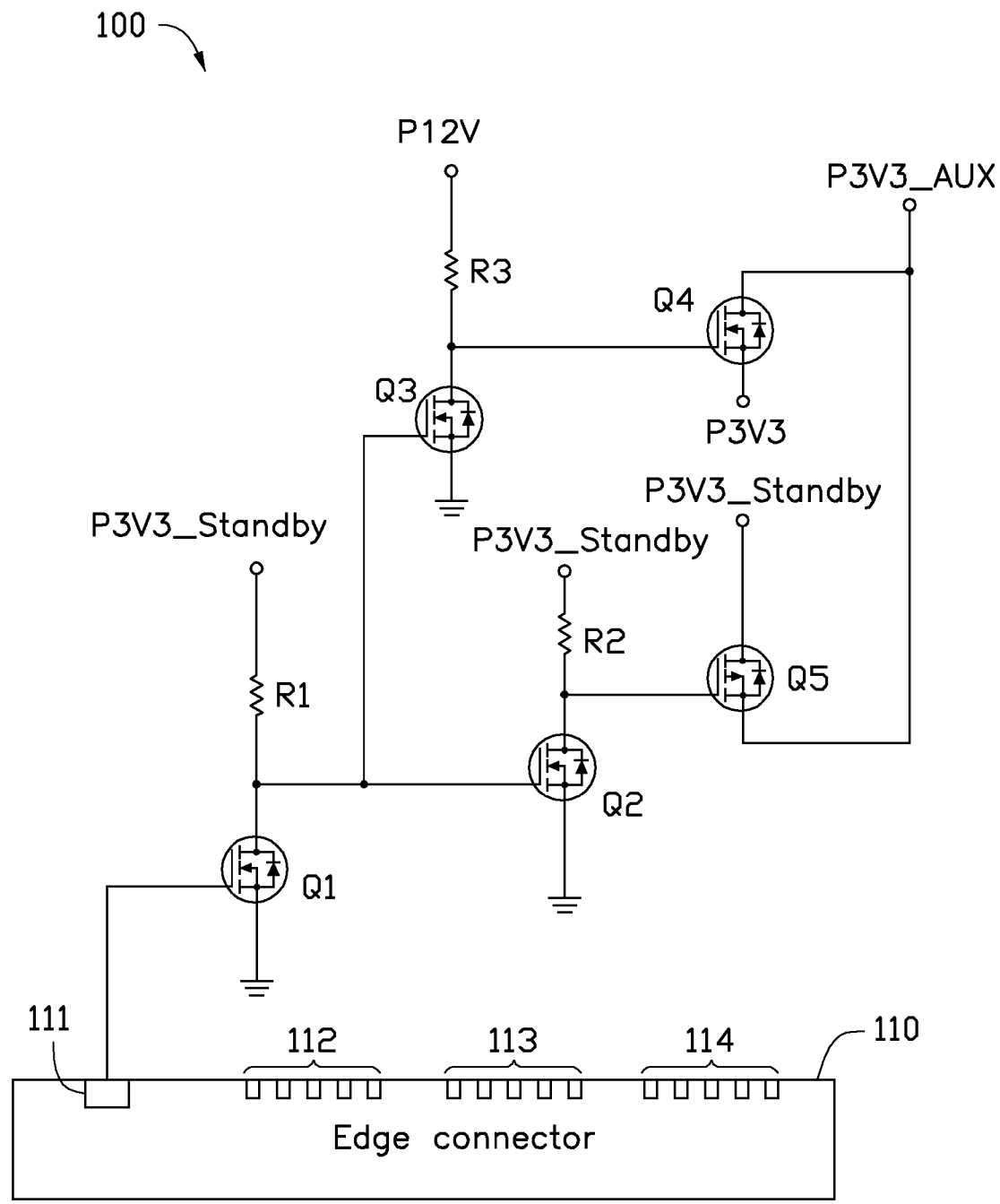
FIG. 1 is a circuit diagram of an expansion card in accordance with an exemplary embodiment of the present disclosure.

The disclosure, including the drawing, is illustrated by way of example and not by way of limitation. References to "an" or "one" embodiment in this disclosure are not necessarily to the same embodiment, and such references mean at least one.

FIG. 1 shows an expansion card 100 of the embodiment. The expansion card 100 includes five electronic switches (in one embodiment, four n-channel field effect transistors (FETs) Q1-Q4 and one p-channel FET Q5), resistors R1-R3, a standby voltage output terminal P3V3_AUX, and an edge connector 110 arranged on a bottom side of the expansion card 100. In one embodiment, the expansion card 100 is a peripheral component interconnection (PCIe) card. The edge connector 110 includes an idle pin 111, a plurality of power pins 112, a plurality of ground pins 113, and a plurality of signal pins 114.

A gate of the FET Q1 is connected to the idle pin 111 of the edge connector 110. A source of the FET Q1 is grounded. A drain of the FET Q1 is connected to gates of the FETs Q2 and Q3 and also connected to a standby power P3V3_Standby through the resistor R1. Sources of the FETs Q2 and Q3 are grounded. A drain of the FET Q2 is connected to a gate of the FET Q5 and also connected to the standby power P3V3_Standby through the resistor R2. A source of the FET Q5 is connected to the standby voltage output terminal P3V3_AUX. A drain of the FET Q5 is connected to the standby power P3V3_Standby. A drain of the FET Q3 is connected to a gate of the FET Q4 and also connected to a system power P12V through the resistor R3. A source of the FET Q4 is connected to a system power P3V3. A drain of the FET Q4 is connected to the standby voltage output terminal P3V3_AUX. The expansion card 100 receives standby voltages through the standby voltage output terminal P3V3_AUX. The standby power P3V3_Standby and the system powers P12V and P3V3 can be received from a motherboard of a computer through the edge connector 110.

Figure 2:
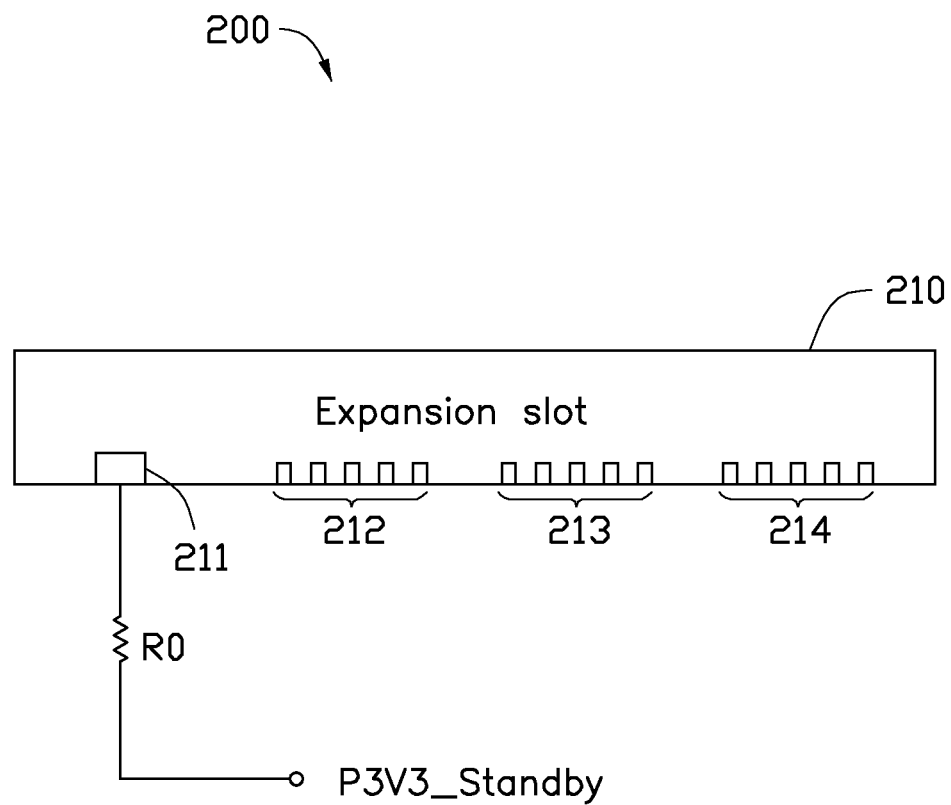
FIG. 2 is a schematic diagram of a motherboard for supporting the expansion card of FIG. 1.

FIG. 2 shows that the motherboard 200 includes an expansion slot 210 (in one embodiment, the expansion slot 210 is a PCIe slot) and a resistor R0. The expansion slot 210 includes a plurality of power pins 212, a plurality of ground pins 213 connected to a ground layer of the motherboard 200, a plurality of signal pins 214, and an idle pin 211. The idle pin 211 is connected to the standby power P3V3_Standby through the resistor R0. In use, the expansion card 100 is engaged in the expansion slot 210 through the edge connector 110. Therefore, the power pins 212 are connected to the power pins 112, the ground pins 213 are connected to the ground pins 113, the signal pins 214 are connected to the signal pins 114, and the idle pin 211 is connected to the idle pin 111.

When standby voltages provided by a power supply unit of a computer cannot satisfy a standby voltage requirement of the computer with the motherboard 200, the expansion card 100 is connected to the motherboard 200. The motherboard 200 is powered on, the FET Q1 receives a high level signal from the standby power P3V3_Standby through the idle pins 111 and 211. The FET Q1 is turned on. The drain of the FET Q1 outputs a low level signal. The FETs Q2 and Q3 are turned off. The FET Q4 receives a high level signal from the system power P12V and is turned on. The expansion card 100 receives a standby voltage from the system power P3V3 through the FET Q4 and the standby voltage output terminal P3V3_AUX, to operate normally.

When the standby voltages provided by the power supply unit can satisfy a standby voltage requirement of the computer, the expansion card 100 is connected to a known motherboard. The known motherboard is powered on, due to a pin of the known motherboard connected to the idle pin 111 of the expansion slot 100 being grounded, when the expansion card 100 is connected to the known motherboard, the FET Q1 receives a low level signal through the edge connector 111 and is turned off. The gates of the FETs Q2 and Q3 receive high level signals from the standby power P3V3_Standby and are turned on. The drains of the FETs Q2 and Q3 output low level signals. The FET Q4 is turned off. The FET Q5 is turned on. The expansion card 100 receives a standby voltage from the standby power P3V3_Standby through the FET Q5 and the standby voltage output terminal P3V3_AUX, to operate normally.

Therefore, when the standby voltages provided by the power supply unit cannot satisfy a standby voltage requirement of the computer, the expansion card 100 is connected to the motherboard 200 for receiving a standby voltage from the system power of the motherboard 200 for operating. When the standby voltages provided by the power supply unit can satisfy a standby voltage requirement of the computer, the expansion card 100 is connected to the known motherboard for receiving a standby voltage from the standby power of the known motherboard for operating.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An expansion card, comprising:
   first to third resistors;
   a standby voltage output terminal;
   an edge connector comprising a plurality of power pins, a plurality of ground pins, a plurality of signal pins, and an idle pin;
   a first electronic switch comprising a first terminal connected to the idle pin of the edge connector, a second terminal grounded, and a third terminal connected to a standby power through the first resistor;
   a second electronic switch comprising a first terminal connected to the third terminal of the first electronic switch, a second terminal grounded, a third terminal connected to the standby power through the second resistor;
   a third electronic switch comprising a first terminal connected to the third terminal of the first electronic switch, a second terminal grounded, a third terminal connected to a first system power through the third resistor;
   a fourth electronic switch comprising a first terminal connected to the third terminal of the third electronic switch, a second terminal connected to a second system power, a third terminal connected to the standby voltage output terminal; and
   a fifth electronic switch comprising a first terminal connected to the third terminal of the second electronic switch, a second terminal connected to the standby voltage output terminal, a third terminal connected to the standby power;
   wherein when the first electronic switch receives a high level signal through the idle pin of the edge connector, the first electronic switch is turned on, the second, third, and fifth electronic switches are turned off, the fourth electronic switch is turned on, the second system power outputs a standby voltage through the standby voltage output terminal; when the first electronic switch receives a low level signal through the idle pin of the edge connector, the first electronic switch is turned off, the second and third electronic switches are turned on, the fourth electronic switch is turned off, the fifth electronic switch is turned on, the standby power outputs a standby voltage through the standby voltage output terminal.

2. The expansion card of claim 1, wherein the first to fourth electronic switches are n-channel field effect transistors (FETs), the fifth electronic switch is a p-channel FET, first to third terminals of the first to fifth electronic switches correspond to gates, sources, and drains of the FETs.

3. The expansion card of claim 1, wherein the expansion card is a peripheral component interconnection express (PCIe) card.

4. The expansion card of claim 1, wherein the standby power and the first and second system powers are received through the edge connector.

5. A motherboard assembly, comprising:
   a motherboard comprising:
      a first resistor; and
      an expansion slot comprising a plurality of first power pins, a plurality of first ground pins, a plurality of first signal pins, and a first idle pin connected to a standby power through the first resistor; and
   an expansion card comprising:
      second to fourth resistors;
      a standby voltage output terminal;
      an edge connector comprising a plurality of second power pins, a plurality of second ground pins, a plurality of second signal pins, and a second idle pin;
      a first electronic switch comprising a first terminal connected to the idle pin of the edge connector, a second terminal grounded, and a third terminal connected to the standby power through the second resistor;
      a second electronic switch comprising a first terminal connected to the third terminal of the first electronic switch, a second terminal grounded, a third terminal connected to the standby power through the third resistor;
      a third electronic switch comprising a first terminal connected to the third terminal of the first electronic switch, a second terminal grounded, a third terminal connected to a first system power through the fourth resistor;
      a fourth electronic switch comprising a first terminal connected to the third terminal of the third electronic switch, a second terminal connected to a second system power, a third terminal connected to the standby voltage output terminal; and
      a fifth electronic switch comprising a first terminal connected to the third terminal of the second electronic switch, a second terminal connected to the standby voltage output terminal, a third terminal connected to the standby power;
      wherein in response to the expansion card being connected to the motherboard through the edge connector, the first electronic switch receives a high level signal through the first and second idle pins, the first electronic switch is turned on, the second, third, and fifth electronic switches are turned off, the fourth electronic switch is turned on, the second system power outputs a standby voltage through the standby voltage output terminal; in response to the expansion card not being connected to the motherboard, the first electronic switch receives a low level signal, the first electronic switch is turned off, the second and third electronic switches are turned on, the fourth electronic switch is turned off, the fifth electronic switch is turned on, the standby power outputs a standby voltage through the standby voltage output terminal.

* * * * *